Feb. 4, 1947.  F. ULRICH  2,415,395
MOLDING APPARATUS FOR SLIDE FASTENER SLIDERS
Filed Dec. 4, 1943  3 Sheets-Sheet 3
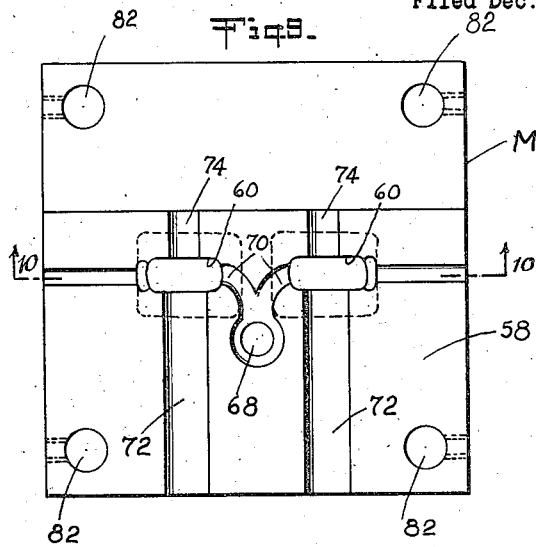
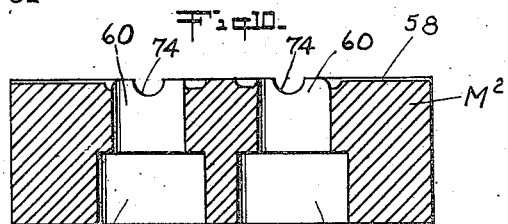
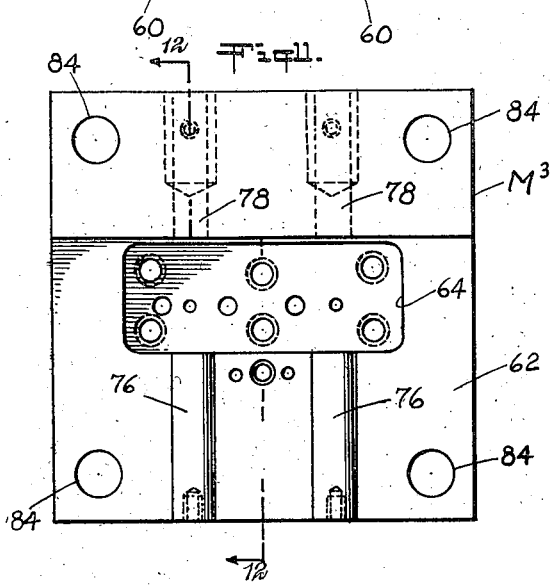
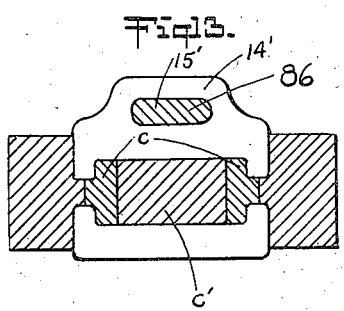
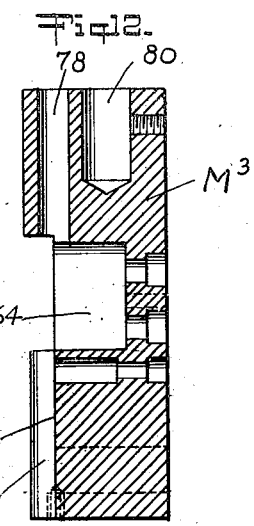
INVENTOR
Frederick Ulrich
BY
ATTORNEY Patented Feb. 4, 1947

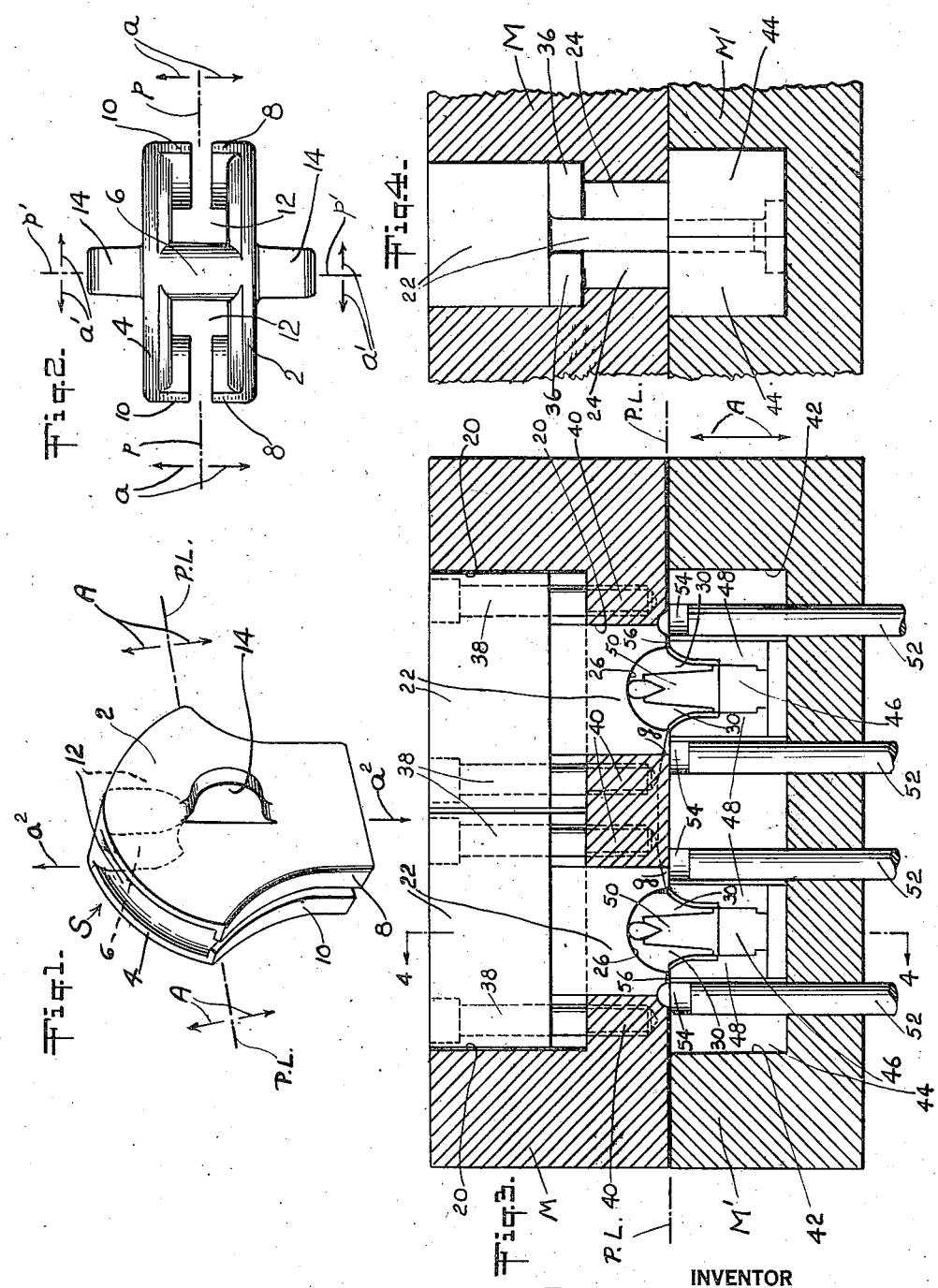

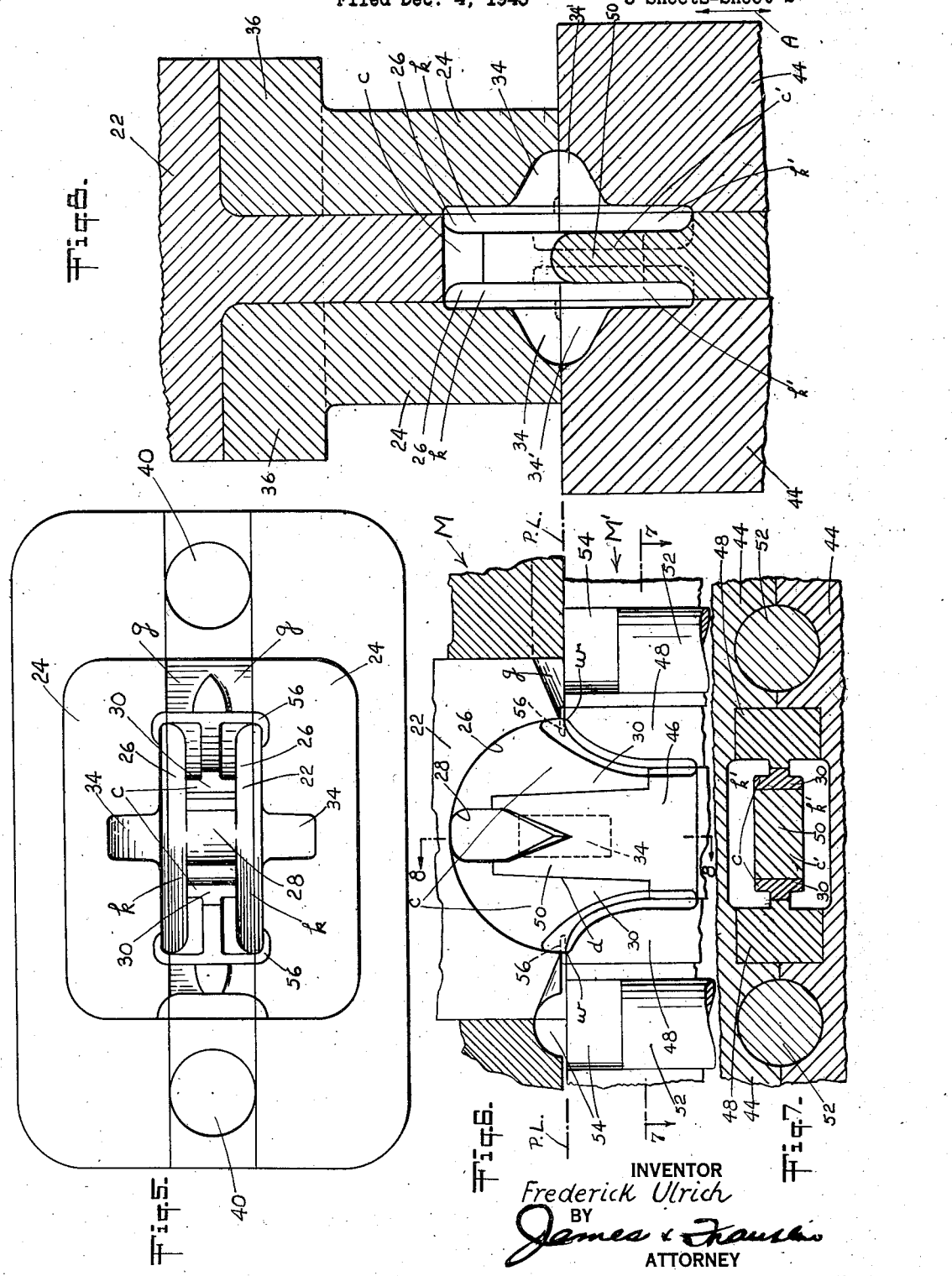

2,415,395

UNITED STATES PATENT OFFICE 2,415,395

MOLDING APPARATUS FOR SLIDE FASTENER SLIDERS

Frederick Ulrich, Jersey City, N. J., assignor to Conmar Products Corporation, Newark, N. J., a corporation of New Jersey Application December 4, 1943, Serial No. 512,898

2 Claims. (Cl. 18—42)

This invention relates to a molding apparatus for molding slide fastener sliders.

Slide fastener sliders are constructed to comprise two parallel walls or wings, provided with inturned flanges at their sides, spacedly connected centrally at one end by a bridge piece or wedge-shaped web. The slider walls and bridge piece interiorly define a Y-shaped slider channel. Such sliders when molded or die cast are formed in molds or dies, such as two-part molds provided with additional movable cores, the cores functioning to form the Y-shaped channel within the slider.

It has hitherto been the practice to so construct the molds that the meeting and parting plane of the mold sections (e. g. a two-part mold) is disposed longitudinally of the slider (and hence the mold sections are relatively movable transversely of the slider), while the cores for forming the Y-shaped slider channel are movable longitudinally of the slider and hence perpendicularly to the mold motion. This necessitates the use of a multiple-part mold structure, comprising a two-part mold and added movable and retractable cores or core members, the mold parts and core members being movable in different lines or planes.

Such mold constructions are more or less complicated and favor the formation of flash because of the many movable parts which must be given adequate clearances. Furthermore, in the operation of such constructions, additional means have to be provided for the operation of the movable cores, which means must function to control the relative positioning and movement of the parts in their proper relationship.

The prime object of my present invention centers about the provision of a molding apparatus for molding slide fastener sliders in which the use of separate movable cores is eliminated, thus obviating all of their attendant disadvantages. According to the present invention, a mold construction is provided in which a two-part mold without movable cores is used to form all of the exterior and interior surfaces of the slider, the two mold parts being formed with mold cavities and immovable or integral cores so shaped and arranged and the mold parts being so relatively movable as to form both interiorly and exteriorly the walls and connecting bridge piece of the slider.

It is a further object of the invention to provide a molding apparatus of the character described in which the referred-to mold cavities and cores are formed by groups of easily machined and readily assembled insert pieces.

Other objects of the invention include the provision of such a molding apparatus in which not only the slider walls and connecting bridge are formed by the cavities and cores of a two-part mold but also pull receiving orificed lugs in a wall or the walls of the slider.

To the accomplishment of the foregoing objects and such other objects as may hereinafter appear, my invention relates to the molding apparatus and the parts thereof for making slide fastener sliders as sought to be defined in the appended claims and as described in the following specification taken together with the accompanying drawings, in which:

Fig. 1 is a perspective view of a slide fastener slider molded with the molding apparatus of my present invention;

Fig. 2 is a top plan view of the slider;

Fig. 3 is a partially sectioned plan view of the two-part mold of the molding apparatus of the present invention;

Fig. 4 is a view thereof taken in cross-section in the plane of the line 4—4 of Fig. 3, the section being taken only through the mold casings;

Fig. 5 is an elevational view shown on an enlarged scale, of the upper mold part looking into the mold from in front of the parting plane thereof;

Fig. 6 is a plan view of the essential mold parts and inserts shown in Fig. 3 of the drawings but drawn to an enlarged scale;

Fig. 7 is a view of Fig. 6 taken in cross-section in the plane of the line 7—7 of Fig. 6;

Fig. 8 is a view of Fig. 6 (showing additional parts) taken in cross-section in the plane of the line 8—8 of Fig. 6;

Fig. 9 is an elevational view of one part of another two-part mold constructed according to the principles of the present invention, this view showing the parting surface of the mold part with the inserts removed from the mold part;

Fig. 10 is a view of Fig. 9 taken in cross-section in the plane of the line 10—10 of Fig. 9;

Fig. 11 is an elevational view of the mold part which is mateable with the mold part shown in Figs. 9 and 10, this view showing the parting surface of the mold part, the inserts being removed from the mold part;

Fig. 12 is a view of Fig. 11 taken in cross-section in the plane of the line 12—12 of Fig. 11; and Fig. 13 is a diagrammatic section through the inserts of a modified mold in the closed position of the two parts of the mold.

Referring now more in detail to the drawings, reference may first be had to Figs. 1 and 2 thereof which show a conventional shaped slide fastener slider generally designated as S, adapted to be molded by the molding apparatus of the present invention. This slider S, having a narrow lower end and a wide upper end, comprises two parallel walls or wings 2, 4 spacedly connected centrally at the top end of the slider by a bridge piece or wedge-shaped web 6. The slider wall 2 is provided with the inturned flanges 8, 8 at its sides, and the slider wall 4 is provided with the inturned flanges 10, 10 at its sides. The slider walls 2 and 4 and the bridge piece 6 interiorly define a Y-shaped slider channel 12. The slider is also provided with a lug on one or both of its walls for an orifice (not shown) which in turn receives a slider pull.

The slider S when molded or die cast according to known practice is formed in a two-part mold provided with additional movable cores. The two-part mold has been so constructed that the meeting and parting plane of the mold sections is disposed longitudinally of the slider either in a plane such as the plane $p$ (see Fig. 2) or a plane such as a plane $p'$. In either event, the mold sections are relatively movable transversely of the slider, thus either in the line represented by the arrows $a, a$ or in the line represented by the arrows $a', a'$. In either event, the cores for forming the Y-shaped slider channel 12 are movable longitudinally of the slider (and hence perpendicularly to the mold motion) in a line as represented in Fig. 1 by the arrows $a^2, a^2$. This as will be noted, necessitates the use not only of a two-part mold but of added movable and retractable cores or core members, the core members and mold parts being movable in different lines or planes.

In accordance with the principles of the present invention, the molding apparatus is made to comprise a two-part mold formed with resultant mold cavities and fixed cores so shaped and arranged and the molds being so relatively movable as to form all of the parts of the slider, thus forming both interiorly and exteriorly the walls 2 and 4 and their adjunctive parts, as well as the bridge piece 6. According to the principles of the present invention, these two mold parts are built so as to have a parting line or plane represented by the line P. L. in Fig. 1 of the drawings, the two mold parts being relatively movable in a line or direction perpendicular to said plane as represented by the arrows A (see Fig. 1).

In Figs. 3 to 8 of the drawings, I show one embodiment of the molding apparatus of my present invention designed and constructed to produce the slider S in the manner referred to. The mold consists of the mold parts M and M' and may be of a type for forming a plurality of sliders at a time, a mold for producing two sliders at a time being illustrated in the drawings. The mold parts M and M' are movable relatively to each other in the direction or line indicated by the arrows A, and have a meeting and parting line or plane P. L. perpendicular thereto. In the particular mold shown, the mold part M is stationary and the mold part M' is movable; and any suitable known means are employed for operating the mold parts. Moldable material is injected through a sprue-hole (not shown) formed in the stationary mold part M and forced through the gates $g, g$ (see Fig. 5) to the mold cavities.

To carry out the principle of operation described, the molding apparatus comprises the two mold parts M and M' relatively movable as described and having the meeting and parting plane P. L., each mold part being provided with a mold cavity and a centrally arranged core, both extending from within such mold part toward the parting plane P. L. thereof, the mold cavity and the core of one mold part being mateable respectively with the mold cavity and the core of the other mold part to form interiorly and exteriorly the walls and bridge piece of the slider. Thus, referring to Figs. 6 to 8 of the drawings, the mold M is constructed to provide the cavity sections $k, k$ and the core $c$ extending from within the mold M toward (the core extending beyond and crossing) the parting plane P. L., while the mold M' is constructed to provide the cavity section $k', k'$ and the core $c'$ extending from within the mold M' towards (the core $c'$ also extending beyond and crossing) the parting plane P. L. As clearly shown in these Figs. 6, 7 and 8, the mold cavities $k, k$ and core $c$ of the one mold part M mate respectively with the mold cavities $k', k'$ and core $c'$ of the other mold part M' to form all the surfaces, interiorly and exteriorly of the slider, of the slider walls and connecting bridge piece.

The parting plane P. L. of the mold parts is taken exteriorly near the widest part $w$ of the slider (see Fig. 6). To form the bridge piece 6 and the Y-shaped slider channel 12 (Figs. 1 and 2), the core $c$ is formed into the two branches best shown in Figs. 6 and 7 and the core $c'$ is formed as a plug which, when the mold parts are closed, moves into and is received between the core branches $c$. The line $d$ in Fig. 6 indicates the contours of the core branches $c$ and of the core $c'$. Interiorly of the mold parts the parting plane P. L. continues into the irregular meeting planes defined by the core members $c$ and $c'$.

As thus constructed, the two-part mold M, M' eliminates the use of movable cores, and instead makes possible the use of cores such as $c$ and $c'$ fixed to and hence movable with the mold parts. Separate slider-channel forming cores are separate mechanism for operating the same are thus eliminated, resulting in considerable simplification of the construction and operation of the molding apparatus. Formation of flash due to imperfect fitting of movable cores is thus also avoided.

The cavities $k$ and $k'$ and the core members $c$ and $c'$ of the mold parts may most conveniently be fashioned by means of shaped pieces or inserts fitted into suitable recesses in the mold sections or casings. Thus the stationary mold part M is provided with the two recesses 20, 20 each receiving a group of inserts (three inserts) for forming the upper part of the slider. Since these groups are duplicates (forming two sliders), a description of one will suffice for both. The three inserts comprise the center insert 22 and the flanking inserts 24, 24. Insert 22 is formed on its mold surface with the cavities 26, 26 and with the cavity 28 to help form the slider body or walls and the slider bridge piece; and the said insert 22 is also provided with the pendent prongs 30, 30 which form the core branches $c$, these prongs of the core member $c$ serving (in conjunction with the core member $c'$) to form the Y-shaped slider channel 12 and the slider flanges 8 and 10 of the slider (Fig. 1). The inserts 24, 24 contribute to the formation of the slider body or walls and these inserts mate with the insert 22 to form the cavities $k, k$ (see particularly Fig. 8). To help produce the slider lugs (14 of Fig. 1), the inserts 24, 24 are suitably recessed as at 34, 34 (best shown in Figs. 5 and 8). Each of the inserts 24 is provided with a projecting flange 36 (see particularly Figs. 4 and 8) which is clamped in place between the casing of mold part M and the top head of the insert 22. Two screws 38 located between the flanges 36 connect each insert 22 to the mold part M, and thus also clamp the inserts 24, 24 in position. The screw holes in the mold part M for receiving screws 38, 38 are indicated as 40 (Figs. 3 and 5).

The movable mold part M' is provided with a large recess 42 which receives two complementary inserts 44, 44 which in turn receive two groups of inserts; and since the two groups of inserts are duplicates, a description of one of them will suffice. Each group consists of three insert pieces, namely, a central insert 46 and two flanking inserts 48, 48 (see particularly Fig. 7). These three inserts (of each group) together with the inserts 44, 44, complete the molding cavity or cavity sections and the core for the bottom of the slider. The central insert 46 is formed with the upstanding plug body 50 which defines the core piece $c'$ above described. The inserts 44, 44, 48, 48 and 46 define, as most clearly shown in Fig. 7 of the drawings, the cavities $k'$, $k'$ and the core member $c'$, of the movable mold part, thus forming for the bottom section of the slider, the slider walls with their flanges and the slider channel. To complete the formation of the lug or lugs, the inserts 44, 44 are further recessed as at 34', 34'. It is also to be noted that the inserts 48, 48 have central ribs which mate with ribs formed in the core members $c$ and $c'$ so as to form the flanges of slider walls, this being seen particularly in Figs. 6 and 7 of the drawings.

Reverting to Figs. 3 and 4 of the drawings, the movable mold part M' is provided with four knock-out pins 52, 52 located between the complementary inserts 44, 44 and arranged to be actuated by a suitable knock-out mechanism. The moldable material when injected into the mold is forced not only into the molding cavities but also into plugs 54 (Figs. 3 and 6) which receive the knock-out impulse. Webs or overflows 56, 56 clearly shown in Figs. 5 and 6 of the drawings serve to strengthen the blank formed by molding or die casting, this blank comprising a sprue, two gates such as $g$, $g$, two sliders S, the two aforementioned plugs 54, 54 and the connecting webs 56, this being best indicated in Figs. 3 and 5 of the drawings.

This described molding apparatus is suitable for molding or die casting the sliders with any suitable molding or die casting material, such as thermoplastic and thermosetting resinous compounds and mixtures, or suitable metals and metal alloys. In molding sliders from resinous materials, different methods may be used such as injection molding, compression molding or transfer molding.

The slider made in a mold according to Figs. 3 to 8 of the drawings has no orifice in any of its walls. An orifice, however, is generally provided in the case of locking sliders in the front slider wall for the free end of a locking pin which passes through the orifice to engage the slide fastener elements. To make provision for forming this orifice in the molding operation, a mold such as shown in Figs. 9 to 12 of the drawings may be provided.

The mold illustrated in Figs. 9 to 12 of the drawings is constructed for forming two sliders, the upper wall of each of which is to be provided with an orifice in the front wall of the slider. This mold, as before, comprises the two mold parts or sections $M^2$ and $M^3$. The mold part $M^2$ is the stationary mold, while the mold part $M^3$ is the movable mold. The mold part $M^2$ is formed with the two insert receiving recesses 60, 60, while the complementary mold part $M^3$ is formed with the insert receiving recess 64. The meeting or parting surface of the mold part $M^2$ is the surface 58, while the meeting and parting surface of the mold part $M^3$ is the surface 62. The recesses 60, 60 of this illustrated form correspond to the recesses 20, 20 of the mold part M of Figs. 3 to 8, while the recess 64 of this form corresponds to the recess 42 of the mold part M' of Figs. 3 to 8; and these recesses are adapted to receive mold forming inserts similar to those described in connection with Figs. 3 to 8 of the drawings, modified as to be described presently. Such inserts as in the embodiment illustrated in Figs. 3 to 8 provide the cavities and cores for forming the walls or bodies of two sliders, the Y-shaped channels of the sliders and the bridge pieces connecting the walls.

The moldable material is injected into the thus formed molding cavities through a spruehole 68 formed in the mold part $M^2$. The spruehole 68 communicates with the molding cavities by gates 70, 70. The mold part $M^2$ is further provided with the two grooves 72, 72 on one side of the recesses 60, 60, and the mold part $M^3$ is provided with the mating ridges or ribs 76, 76, the ends of these ribs serving to form the outer surfaces of the bottom slider walls. The mold part $M^2$ is also provided with the two short grooves 74, 74 (semi-circular in form) (see Fig. 10), which are adapted to receive two rods each carrying at its free end a core member to form the orifice in the wall of the slider or the orifice together with a lug for supporting a slider pull. The mold part $M^3$ is in turn formed with the two bores 78, 78 for slidably guiding these rods which rods are movable in the direction of the bores. The mold part $M^3$ may also be provided with one or more bores such as 80 (Fig. 12) for receiving a post or posts along which the said rods may be slid to move and withdraw the orifice forming rod and core. The mold parts $M^2$ and $M^3$ are also provided with guide pins and pin receiving holes 82 and 84.

In the sliders made in the molding apparatus of Figs. 3 to 8, the lugs are formed or molded solid so that the lug orifice for receiving a slider pull must be drilled therein in a separate drilling operation. The mold apparatus may be modified so that the lug orifice may also be produced in the molding operation. Such a modification of the molding apparatus is shown in Fig. 13 of the drawings. Referring to Fig. 13, the mold to be used is so designed that a slider having one lug may be molded or die cast without the use of movable cores and without the necessity of any subsequent drilling operation. For this purpose the slider is provided with a transversely arranged lug such as 14' and this is correspondingly orificed as at 15'. To accomplish this, a core member 86 is provided which is made movable with either the core member of a mold such as M or the core member of a mold such as M' (of Figs. 3 to 8). Thus comparing Fig. 13 and Fig. 7 of the drawings, the core member 86 extending from within its mold parts towards (and beyond) the parting plane thereof, may be formed in the mold carrying the core branches $c$, $c$, or with the mold carrying the core $c'$. Thus the core 86 moves in the same direction as either the core $c$ or the core $c'$, and thereby is fixedly connected with one of the mold parts.

The construction of the molding apparatus for making slide fastener sliders of the present invention, the operation thereof and the many advantages resulting therefrom will in the main be fully apparent from the above detailed description thereof. The two-part mold of this apparatus, and without the use of any additional movable cores, is used to form all of the exterior and interior surfaces of the slider, and is designed particularly to form both interiorly and exteriorly the walls and connecting bridge piece of the slider. Two mold parts may be furthermore so designed that in addition to forming the pull receiving lugs on one or both of the slider walls, the lugs may additionally be orificed in the molding operation. Thereby a considerably simplified molding apparatus for molding a slider, and the elimination of movable cores and operating means therefore or the elimination of subsequent drilling operations, is produced. Manufacture of the molded sliders with great economy is obtained, and the resulting sliders are produced with a minimum of flash.

While I have shown the molding apparatus in preferred forms, it will be understood that many changes may be made therein without departing from the spirit of the invention defined in the following claims.

I claim:

1. A mold for a slide fastener slider having spaced parallel wings with flanged side edges spacedly connected at one end by a bridge piece, said flanges and bridge piece defining a Y-shaped slider channel having a longitudinal axis along the stem of the Y, at least one slider wing being provided with a lug for a slider pull, said mold comprising separable die portions separable in the direction of the longitudinal axis on a parting plane extending transversely of the longitudinal axis at the widest part of the slider and passing through the lug, one die portion having a cavity and two spaced fixed cores projecting in the direction of mold motion through the cavity and beyond the parting plane, the other die portion having a cavity and a single fixed core projecting in the direction of mold motion through the cavity and beyond the parting plane, said single core fitting accurately between the aforesaid spaced cores to form the interior of the slider, the outer edges of the spaced cores helping define the flanged edges of the slider body, the free end of the single core forming the inner portion of the bridge piece, and the remainder of the bridge piece being defined between the spaced cores at their base end.

2. A mold for a slide fastener slider having spaced parallel wings with flanged side edges spacedly connected at one end by a bridge piece, said flanges and bridge piece defining a Y-shaped slider channel having a longitudinal axis along the stem of the Y, at least one slider wing being provided with a lug for a slider pull, said mold comprising an ejector die and a cover die separable on a parting plane extending transversely of the longitudinal axis at the widest part of the slider and passing through the lug, said cover die having a cavity and two spaced fixed cores projecting in the direction of mold motion through the cavity and beyond the parting plane, said ejector die having a cavity and a single fixed core projecting in the direction of mold motion through the cavity and beyond the parting plane, said single core fitting accurately between the aforesaid spaced cores to form the interior of the slider, the outer edges of the spaced cores helping define the flanged edges of the slider body, the free end of the single core forming the inner portion of the bridge piece, the remainder of the bridge piece being defined between the spaced cores at their base end, whereby the slider body and lug are formed by the separable halves of a two-part mold devoid of movable cores.

FREDERICK ULRICH.

REFERENCES CITED

The following references are of record in the file of this patent:

UNITED STATES PATENTS

| Number | Name | Date |
|---|---|---|
| 1,498,335 | Von Hambach | June 17, 1924 |
| 2,186,160 | Anderson | Jan. 9, 1940 |
| 2,330,369 | Marsh | Sept. 28, 1943 |
| 2,209,413 | Marinsky | July 30, 1940 |
| 2,266,887 | McCoy | Dec. 23, 1941 |
| 2,300,974 | Rypinski | Nov. 3, 1942 |